Patented Jan. 13, 1942

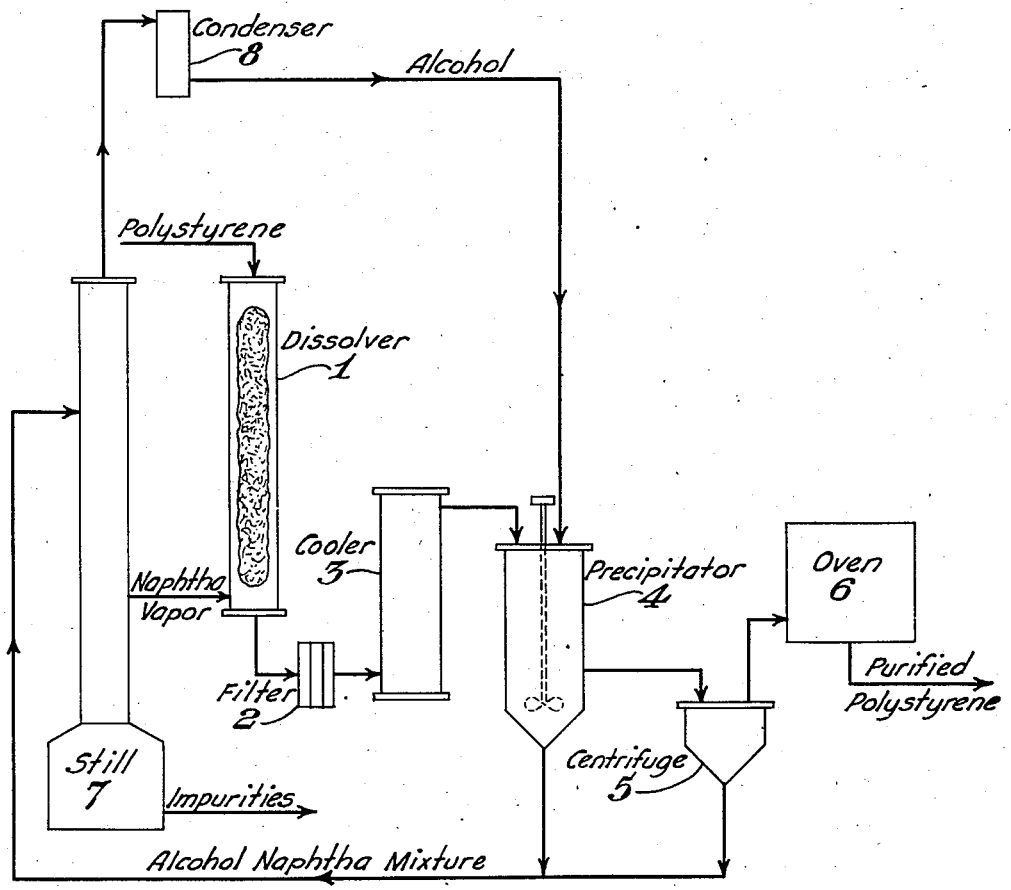

2,270,184

UNITED STATES PATENT OFFICE 2,270,184

METHOD OF PURIFYING VINYL AROMATIC RESINS

Robert R. Dreisbach, Midland, Mich., assignor to The Dow Chemical Company, Midland, Mich., a corporation of Michigan Application February 24, 1939, Serial No. 258,259

6 Claims. (Cl. 260—91)

This invention concerns an improved method of purifying polymerized vinyl aromatic compounds, particularly polystyrene.

It is well known that the resinous product obtained by polymerizing styrene usually includes a small proportion of unpolymerized styrene and that the latter impairs its properties. Other aromatic compounds such as benzene, ethylbenzene, chloroethylbenzene, toluene, etc., which frequently accompany styrene according to usual methods for its manufacture, also often are present as undesirable ingredients in polystyrene.

One of the most effective of the known methods for removing such impurities from polystyrene consists in dissolving the impure polymer in a solvent such as benzene, toluene, or ethylbenzene, etc., and then precipitating the polymer by adding a non-solvent such as alcohol, and removing and drying the precipitate. By such procedure polystyrene of high purity may be obtained, the impurities originally accompanying the polymer remaining dissolved during the precipitation step. However, this method as heretofore practiced has possessed serious disadvantages which rendered it poorly suited to commercial use. For instance, the initial step of dissolving the impure polymer is usually carried out by immersing it in a solvent and then heating until solution is complete. This is a tedious operation. Apparently, the polymer which first dissolves forms a viscous concentrated solution which serves as a coating to prevent ready access of further solvent to the undissolved portion of the polymer, so that the time required to dissolve an appreciable amount of polymer is excessive. Furthermore, when the solution is poured into alcohol, or vice versa, the polymer precipitates as a web-like mass of fine threads. This web-like mass is inconvenient to handle and usually must be converted into other forms, e. g. into granules or bars, etc., in order to be acceptable as a commercial commodity.

The present invention comprises a continuous method of purifying polystyrene or the like which includes the steps of dissolving the impure polymer in a solvent and then precipitating it in relatively pure form by addition of a non-solvent. The invention particularly concerns improved procedure for carrying out these two steps, whereby the dissolving may be done continuously and far more rapidly than has heretofore been possible, and the precipitation may be accomplished to recover the polymer directly in a granular form which is convenient to handle.

I have found that, whereas polystyrene dissolves only sluggishly when immersed in a heated solvent, it may be dissolved readily and rapidly by boiling the solvent under reflux and contacting the solid polymer with the reflux. By operating in this manner, the solution is continuously washed from the undissolved polymer so that fresh surfaces of the latter are constantly exposed to the solvent. I have also found that whereas the dissolved polymer precipitates in web-like form when the solution is poured into alcohol, or vice versa, it may be caused to precipitate in granular form by adding the polymer solution drop-wise, i. e. in the form of individual drops, to the alcohol while stirring the latter. In addition, I have invented a simple continuous method for the purification of polystyrene which includes these steps as well as other steps for the cyclic separation and re-employment of the liquid solvent and the alcohol so that said liquids may be used repeatedly and the cost of effecting the purification is thereby reduced.

The accompanying drawing is a diagrammatic sketch indicating one arrangement of apparatus suitable for use in practicing the invention. The identity of the various pieces of apparatus is marked on the face of the drawing.

In practicing the invention with the apparatus indicated by the drawing, dissolver 1, which may be a reflux tower, is charged with lumps or granules of polystyrene, after which vapors of a solvent, e. g. benzene, toluene, ethylbenzene, solvent naphtha, or ethylene chloride, etc., are passed from still 7 into the lower portion of dissolver 1 and are caused to reflux within the latter. The solvent vapors condensing during this operation dissolve the polymer rapidly and the resultant solution is withdrawn continuously or periodically from the bottom of dissolver 1 and passed while hot through a filter press 2 to remove any solid impurities therein. The solution is then passed through a cooler 3, wherein it is cooled to well below its boiling temperature, preferably to room temperature or thereabout. The solution is then added drop-wise (e. g. as a spray) and with stirring to a liquid non-solvent for polystyrene which is contained in the precipitator 4. As the liquid non-solvent, I usually employ a lower alcohol such as methyl, ethyl, propyl, or butyl alcohol, but other volatile non-solvents which are miscible with the solvent may be employed instead. Examples of such other liquid non-solvents are the petroleum naphthas such as petroleum ether, ligroin, etc.

By adding the polymer solution to the liquid non-solvent in such drop-wise manner, the polymer is precipitated in granular form, whereas the unreacted styrene and other organic impurities originally present in the polymer remain dissolved. This precipitation operation may be carried out in continuous manner by introducing the polystyrene solution and the liquid non-solvent continuously to the precipitator and withdrawing the precipitated polymer and its diluted mother liquid as they are formed, or it may be carried out in batch-wise manner, as desired.

The liquid mixture of solvent and non-solvent is drained from the precipitated polymer and the latter is transferred to a centrifuge 5 where residual liquor is removed by centrifuging. During this operation, it is well to wash the polymer with a small portion of alcohol for the purpose of assuring substantially complete removal of the solvent. Traces of alcohol or other volatile liquids adhering to the polymer are removed by vaporization; usually by warming the polymer to temperatures between 50° and 100° C. in an oven for from 0.5 to 2 hours.

The mixture of liquid solvent and non-solvent separated from the polymer in the precipitator and the centrifuge are transferred to still 7, where they are separated from one another by distillation, the solvent vapors being fed directly into dissolver 1 for purpose of dissolving additional impure polymer and the non-solvent being condensed in condenser 8 and returned to precipitator 4 where it is again used to precipitate polystyrene from its solutions.

Monomeric styrene removed from the crude polystyrene accumulates in still 7 where it gradually polymerizes. The resultant polystyrene solution may be withdrawn from the still periodically and passed through filter 2, cooler 3 and into precipitator 4 to precipitate and recover the additional polymer so formed. The other impurities initially present in the polymer are usually solvents for the latter such as are used in the present process. These other impurities, e. g. benzene, ethylbenzene, toluene, etc., are recycled in the process as additional solvent for the polymer. Crude polymer may, of course, be introduced gradually or periodically into column 1 to replace that dissolved.

By operating as described above, the purification of polystyrene may be effected rapidly and continuously, without appreciable loss of the organic liquids used, to obtain polystyrene of excellent quality.

The following examples illustrate certain ways in which the principle of the invention has been applied, but are not to be construed as limiting the invention.

Example 1

The purpose of this example is to demonstrate the decrease in the time required to dissolve polystyrene which is brought about by contacting the polymer with the reflux of a boiling solvent instead of immersing it in the heated solvent. In the first of two experiments, a section of pipe was charged with polystyrene and coal tar naphtha heated at temperatures between 70° and 90° C. was circulated through the pipe until the concentration of polystyrene in the circulating liquid was 8 per cent by weight. It required 70 hours of continuous circulation to dissolve sufficient polymer to produce a solution of said concentration. In the other experiment the same solvent was boiled under reflux using a reflux column which was charged with polystyrene. After approximately 7.5 hours of refluxing, the liquor contained 8 per cent by weight of dissolved polystyrene.

Example 2

A sample from a batch of polystyrene which had been prepared by the thermal polymerization of a technically pure quality of styrene and which contained a small proportion, probably about 5 per cent by weight, of unpolymerized styrene as well as traces of other impurities such as ethylbenzene, possibly some benzene, etc., was molded at a temperature of 170° C. into test pieces having the dimensions 0.1 inch by 0.5 inch by 1.75 inches. The tensile strength in pounds per square inch cross-section, the impact strength in inch-pounds of energy applied by a blow to cause breakage, the Shore Scleroscope hardness, the heat distortion in degrees centigrade, and the electric power factor of the molded pieces were then determined in the usual ways. It may be mentioned that, except for the size of the test piece, the methods used in determining the impact strength and the heat distortion are similar to those described in A. S. T. M. D256–34T and A. S. T. M. D48–33, respectively. A reflux condenser was charged with lumps of the impure polystyrene from the batch used in making the abovementioned test pieces and the charged condenser was connected with the top of a vessel containing coal tar naphtha. The latter was then boiled, whereby the polymer was dissolved rapidly by the refluxing solvent. Boiling was continued until the liquid in the vessel contained approximately 5 per cent by weight of dissolved polymer. The solution was cooled to room temperature and then added drop-wise to about 4 times its volume of 95 per cent concentrated ethyl alcohol while stirring the latter vigorously. The polymer was thereby precipitated as small granules. The precipitate was separated from the liquor, washed with alcohol and then thoroughly dried by heating it under vacuum to a temperature of about 70° C. The purified polystyrene product was then molded into test pieces and the properties of the pieces were determined as hereinbefore described. The following table gives the properties of the polystyrene before and after the above-described purification treatment.

| Polystyrene tested | Tensile strength | Impact strength | Shore hardness | Heat distortion | Power factor |
|---|---|---|---|---|---|
| Before purification | Lbs./sq. in. 4,800 | In.-lbs. 0.6 | 77 | ° C. 78 | Percent 0.0500 |
| After purification | 8,100 | 1.5 | 86 | 84 | 0.0197 |

The method, as hereinbefore described, may also be applied in purifying soluble polymers of other vinyl aromatic compounds where such polymers contain the unpolymerized compound or other aromatic hydrocarbon impurities, e. g. benzene, ethylbenzene, isopropylbenzene, etc. For instance, it may be applied in purifying polymerized para-chloro-styrene which contains the unpolymerized compound and/or para-chloro-ethylbenzene; in purifying polymerized vinyl naphthalene which contains the unpolymerized compound; etc.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a continuous method for the purification of a polymer of a vinyl aromatic compound, the steps which consist in dissolving the impure solid polymer by exposing it to the vapors and reflux of a boiling solvent, precipitating the polymer by adding the resultant solution in drop-wise manner to a liquid non-solvent for the polymer which is miscible with said solvent, the mixture being stirred during this addition, separating the liquid mixture of solvent and non-solvent from the precipitate, and distilling the liquid non-solvent from the solvent while vaporizing and refluxing the latter through a bed of impure solid polymer, whereby additional polymer is dissolved.

2. In a method for the purification of a polymer of a vinyl aromatic compound, the step of gradually adding in dropwise manner and with stirring a solution of the polymer to a liquid non-solvent for the polymer which is miscible with the solvent in said solution, whereby the polymer is precipitated in granular form.

3. In a method for the purification of a polymer of a vinyl aromatic compound, the steps of dissolving the impure solid polymer by contacting it with the vapors and reflux of a boiling solvent, adding the resultant solution in drop-wise manner to a lower aliphatic alcohol while stirring the latter, whereby the polymer is precipitated in granular form, separating the precipitated polymer and evaporating residual liquid therefrom.

4. In a continuous method for the purification of polystyrene, the steps which consist in dissolving the impure solid polystyrene by contacting it with the vapors and reflux of a boiling solvent, precipitating the polystyrene by adding the resultant solution in drop-wise manner to a lower aliphatic alcohol while stirring the latter, separating the precipitated polystyrene and evaporating residual liquid therefrom.

5. In a method for the purification of polystyrene, the step of adding a solution of the polymer in drop-wise manner to a lower aliphatic alcohol while stirring the latter, whereby the polymer is precipitated in granular form.

6. In a continuous method for the purification of a polymer of a vinyl aromatic compound, the steps which consist in dissolving the impure solid polymer in a solvent, precipitating the polymer by adding the resultant solution in dropwise manner to a liquid non-solvent for the polymer which is miscible with said solvent, the mixture being stirred during this addition, separating the liquid mixture of solvent and non-solvent from the precipitate, and distilling the liquid non-solvent from the solvent while vaporizing and refluxing the latter through a bed of impure solid polymer, whereby additional polymer is dissolved.

ROBERT R. DREISBACH.